United States Patent
Xu

(10) Patent No.: US 9,093,829 B2
(45) Date of Patent: Jul. 28, 2015

(54) TERMINAL PLATFORM

(71) Applicant: SUMITOMO WIRING SYSTEMS, LTD., Yokkaichi, Mie (JP)

(72) Inventor: Hong Xu, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 7 days.

(21) Appl. No.: 14/158,070

(22) Filed: Jan. 17, 2014

(65) Prior Publication Data

US 2014/0220832 A1    Aug. 7, 2014

(30) Foreign Application Priority Data

Feb. 4, 2013   (JP) ................................. 2013-019586

(51) Int. Cl.
*H01R 13/66* (2006.01)
*H02G 3/30* (2006.01)
*H02G 15/02* (2006.01)
*H01R 9/16* (2006.01)

(52) U.S. Cl.
CPC .. *H02G 3/30* (2013.01); *H01R 9/16* (2013.01); *H02G 15/02* (2013.01)

(58) Field of Classification Search
CPC .......... H01R 9/16; H01R 13/66; H01R 43/20; H01R 13/74; H01R 12/716
USPC .......................... 439/733.1, 709, 76.2; 29/747
See application file for complete search history.

(56) References Cited

U.S. PATENT DOCUMENTS

| | | | |
|---|---|---|---|
| 6,322,376 B1 * | 11/2001 | Jetton | 439/76.2 |
| 6,875,052 B1 * | 4/2005 | Lo et al. | 439/564 |
| 7,549,872 B2 * | 6/2009 | Akahori et al. | 439/76.2 |
| 7,762,852 B2 * | 7/2010 | Daly et al. | 439/638 |
| 2010/0261365 A1 | 10/2010 | Sakakura | |

FOREIGN PATENT DOCUMENTS

| | | |
|---|---|---|
| DE | 198 03 141 A1 | 7/1999 |
| JP | A-2008-269981 | 11/2008 |
| JP | A-2009-170357 | 7/2009 |
| WO | WO 2011/070993 A1 | 6/2011 |

OTHER PUBLICATIONS

May 14, 2014 Extended European Search Report issued in European Patent Application No. 14151852.2.

* cited by examiner

*Primary Examiner* — Abdullah Riyami
*Assistant Examiner* — Nader J Alhawamdeh
(74) *Attorney, Agent, or Firm* — Oliff PLC

(57) ABSTRACT

A terminal platform is provided that can be stably supported by a bracket, and that avoids electrical contact between the bracket and a terminal fitting. Terminal fittings that form an L shape by wire connection portions and terminal main bodies are supported on a terminal platform. A platform main body of the terminal platform has (i) support-receiving portions that are supported by a support portion formed on a metal bracket, (ii) a terminal fixing portion that is positioned at a side opposite to the support-receiving portions and fixes the terminal main bodies, and (iii) a surface portion that is arranged to intersect the terminal fixing portion and the support-receiving portions, and that is along the wire connection portions. Additionally, a partition wall of the terminal platform extends to the surface portion and is arranged facing a tip end of the support portion, and separates the wire connection portions.

8 Claims, 8 Drawing Sheets

TERMINAL PLATFORM

BACKGROUND

This application claims priority to Japanese Patent App. No. JP 2013-019586 that was filed on Feb. 4, 2013.

Japanese Pub. Patent App. 2009-170357 discloses a terminal platform as an electric connection box that supports a terminal fitting that is bent in a substantially L shape. The terminal fitting is provided with (i) a portion that is fixed to an upper surface of the terminal platform via a fixing member such as a bolt and (ii) a portion that is arranged along a side surface of the terminal platform and is connected to wiring.

SUMMARY

There are cases in which the above-described terminal platform may be fixed to a metal bracket. In those cases, for example, if a lock portion is arranged on a side surface of the terminal platform, and a mounting piece engageable to the lock portion is protrudingly arranged on the bracket, there is a possibility that the terminal platform may not be stably supported by the bracket, and when a fixing force of a fixing member acts on an upper surface of the terminal platform, the mounting piece separates from the lock portion and the terminal platform may fall from the bracket. Additionally, if the bracket is placed at a position close to the terminal fitting, there is also a possibility that the terminal fitting and the bracket may contact each other and a short circuit may be generated.

An object is to provide a terminal platform that stably supports a bracket and avoids electrical contact between a terminal fitting and a bracket.

A resin terminal platform supports a terminal fitting having (i) a wire connection portion to be connected to wiring and (ii) a terminal main body that extends in a direction intersecting the wire connection portion, and that is provided with a platform main body including (i) a support-receiving portion that is supported by a support portion formed on a metal bracket, (ii) a terminal fixing portion that is positioned at a side opposite to the support-receiving portion and fixes the terminal main body of the terminal fitting, and (iii) a surface portion that is arranged at a side intersecting the terminal fixing portion and the support-receiving portion, and that is along the wire connection portion of the terminal fitting, and a partition wall that extends to the surface portion of the platform main body and is arranged facing a tip end of the support portion.

The terminal fixing portion of the platform main body is positioned at a side facing the support-receiving portion that is supported by the support portion of the bracket. Thus, a fixing force that acts on the terminal fixing portion is directly transmitted to and received by the support portion through the support-receiving portion. Therefore, the terminal platform is stably supported by the bracket.

Meanwhile, because of this structure, there is a concern that the tip end of the support portion is positioned near the wire connection portion of the terminal fitting and that the bracket and the terminal fitting may electrically contact each other. Thus, the partition wall of the terminal platform is arranged facing the tip end of the support portion, whereby the support portion and the wire connection portion are separated by the partition wall, so electrical contact between the bracket and the terminal fitting is avoided, and electrical conduction reliability of the wire connection portion is ensured.

DETAILED DESCRIPTION OF THE EMBODIMENTS

A plurality of the terminal fittings are supported on the surface portion of the platform main body, and a partition wall is arranged, which separates the wire connection portions that are adjacent in a width direction. By the partition wall, electrical contact between the adjacent wire connection portions is avoided.

The partition wall extends out from the platform main body, and when the platform main body is assembled to the bracket in a reversed orientation that is opposite to the normal orientation, a tip end of the partition wall contacts the support portion of the bracket so as to restrict assembly beyond that point. Because the tip end of the partition wall contacts the support portion of the bracket, erroneous assembly of the terminal platform is suppressed. Furthermore, because the structure that suppresses erroneous assembly is constituted by the partition wall, a special structure for suppressing erroneous assembly is not needed, and the structure can be simplified.

Embodiment 1

Figure 1:
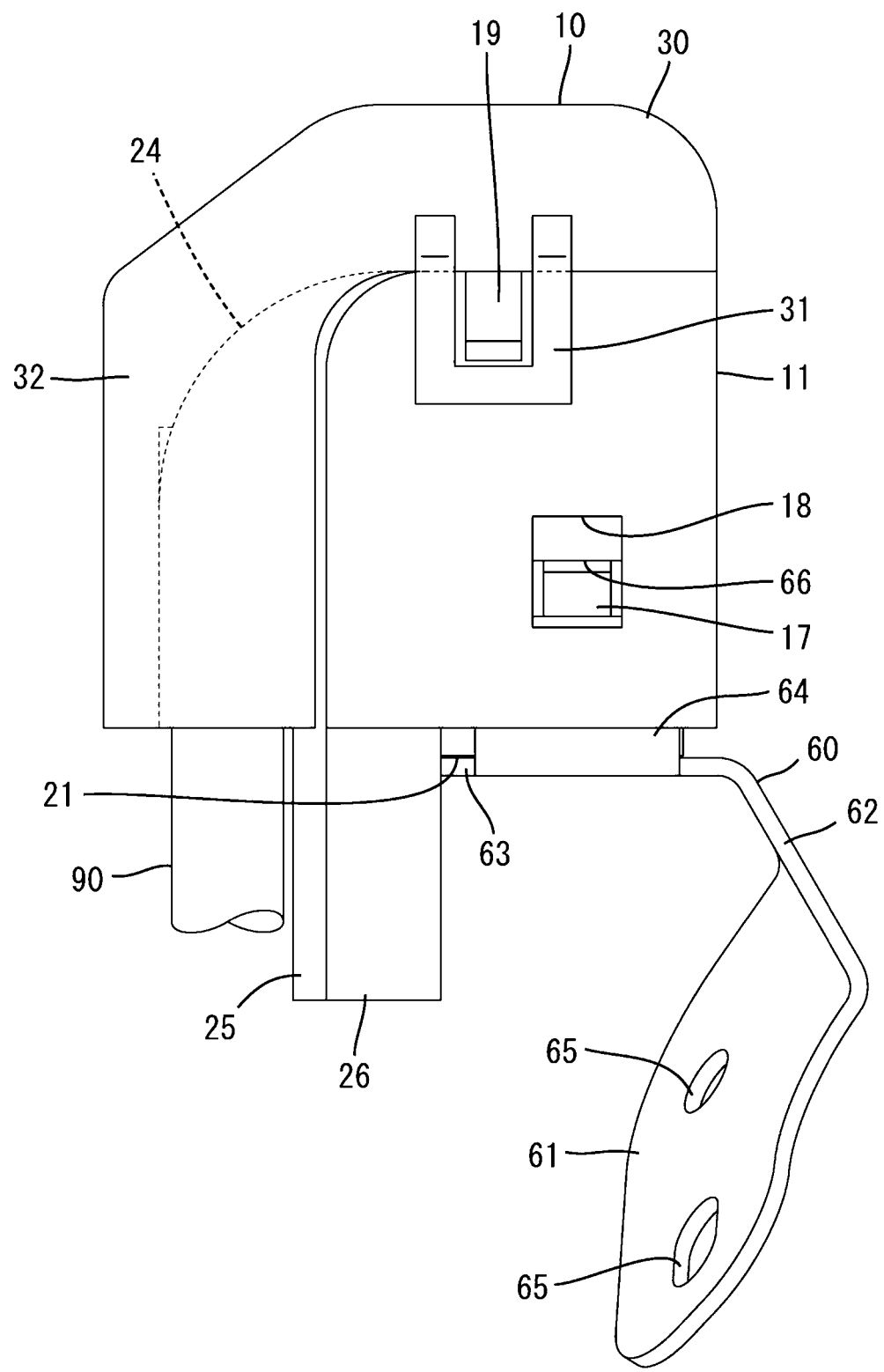
FIG. 1 is a side view showing a state in which a terminal platform of embodiment 1 is fixed to a bracket, a terminal fitting is fixed to a terminal fixing portion, and a cover has been installed.

Embodiment 1 is explained with reference to FIGS. 1-8. A terminal platform 10 of embodiment 1 is an example of a connecting terminal platform that relays a power line of an automobile. The terminal platform 10 is supported by a metal bracket 60, and further, terminal fittings 40 are fixed to the terminal platform 10. Additionally, in the following explanation, with respect to front and rear directions, the right side of FIG. 1 is the front side. With respect to vertical directions, FIG. 1 is used as a reference.

Figure 7:
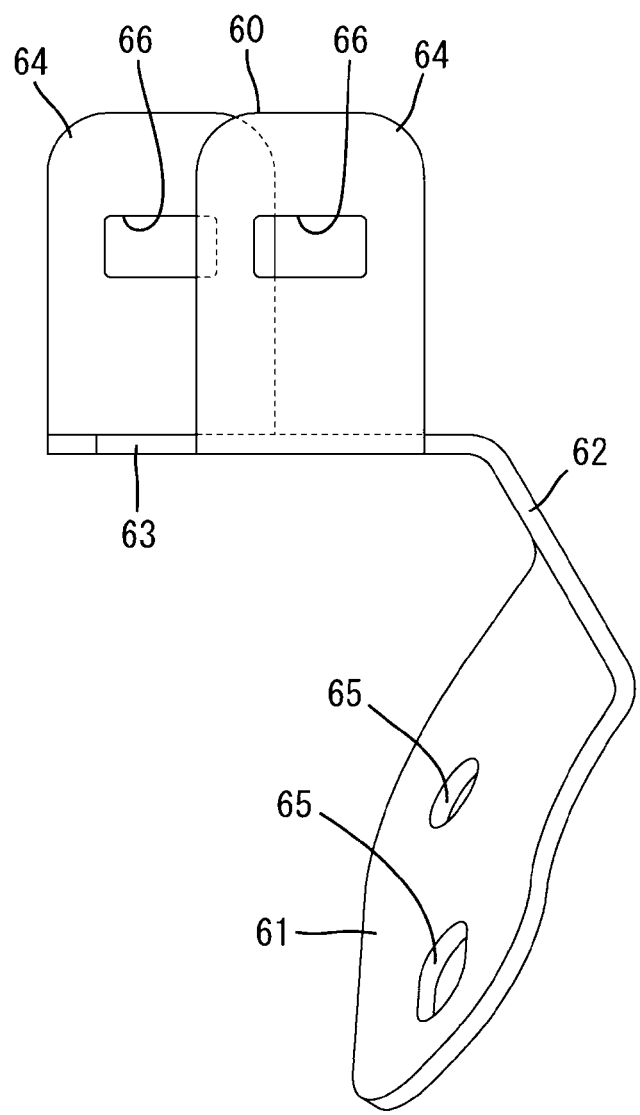
FIG. 7 is a side view of the bracket.

The bracket 60 is metal and is molded by bending a flat plate material as shown in FIG. 7. The bracket 60 is constituted by a base plate portion 61 that is fixed to an installation surface of an undepicted vehicle, a transition portion 62 that connects to an upper end of the base plate portion 61 and bends out from an upper end of the base plate portion 61 at an obtuse angle, a support portion 63 that connects to an upper end of the transition portion 62 and bends out from the upper end of the transition portion 62 at an obtuse angle, and a pair of attachment portions 64 that are bent up from both side edges of the support portion 63 substantially at right angles.

The base plate portion 61 is fixed to an installation surface of an undepicted vehicle by bolts, and has a plurality of through-holes 65 through which the bolts pass. In a state in which the base plate portion 61 is fixed to a vehicle, the support portion 63 is arranged substantially horizontally along a front-to-rear direction. The two attachment portions 64 are at positions shifted relative to each other in the front-to-rear direction at the two side edges of the support portion 63. One of the attachment portions 64 is positioned at a front end of one side edge of the support portion 63, and the other attachment portion 64 is positioned at an intermediate portion, in the front-to-rear direction, of the other side edge of the support portion 63. Additionally, substantially rectangular attachment holes 66 are provided in both of the attachment portions 64.

Figure 2:
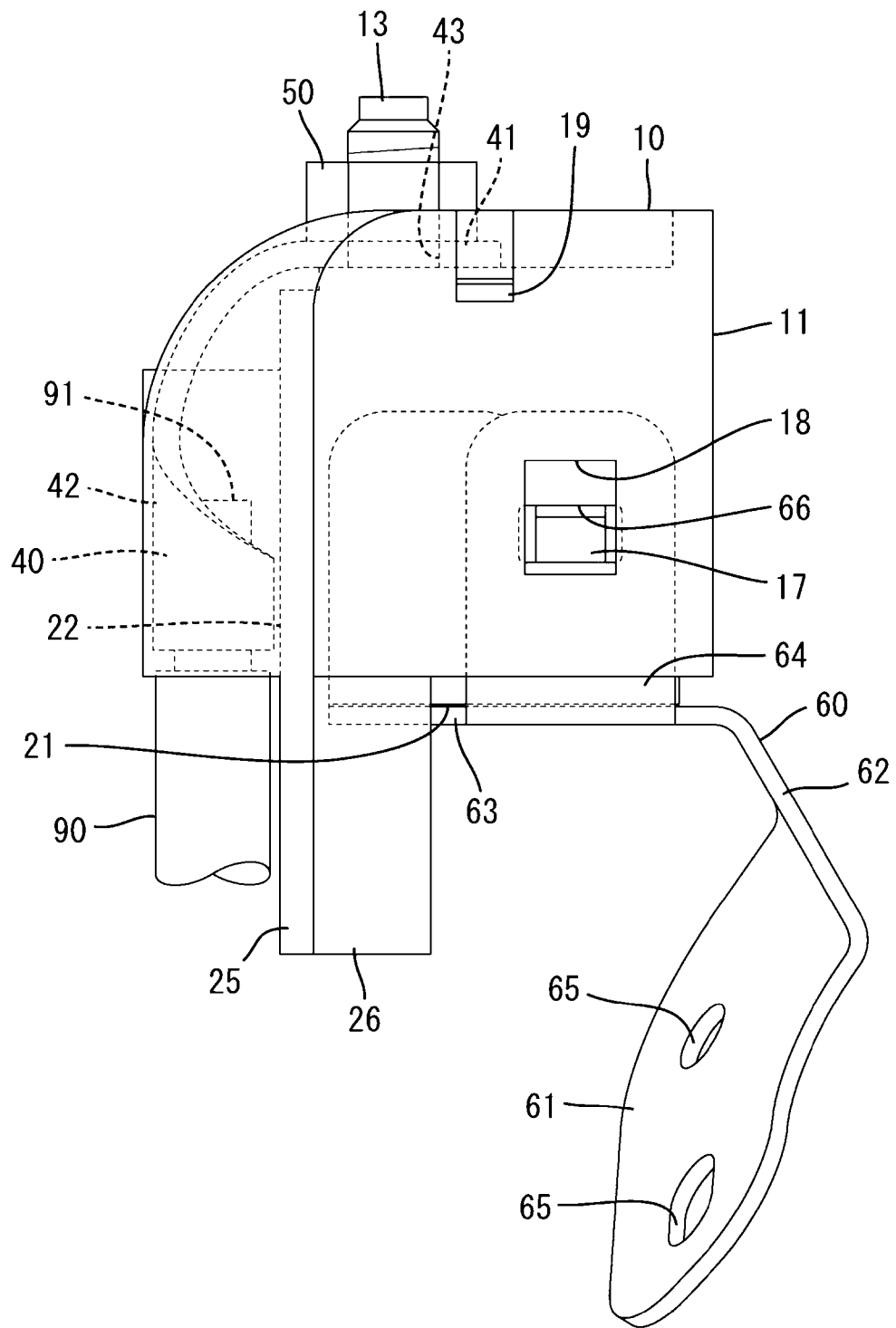
FIG. 2 is a side view showing a state in which the terminal platform is fixed to the bracket, and the terminal fitting is fixed to the terminal fixing portion.
Figure 3:
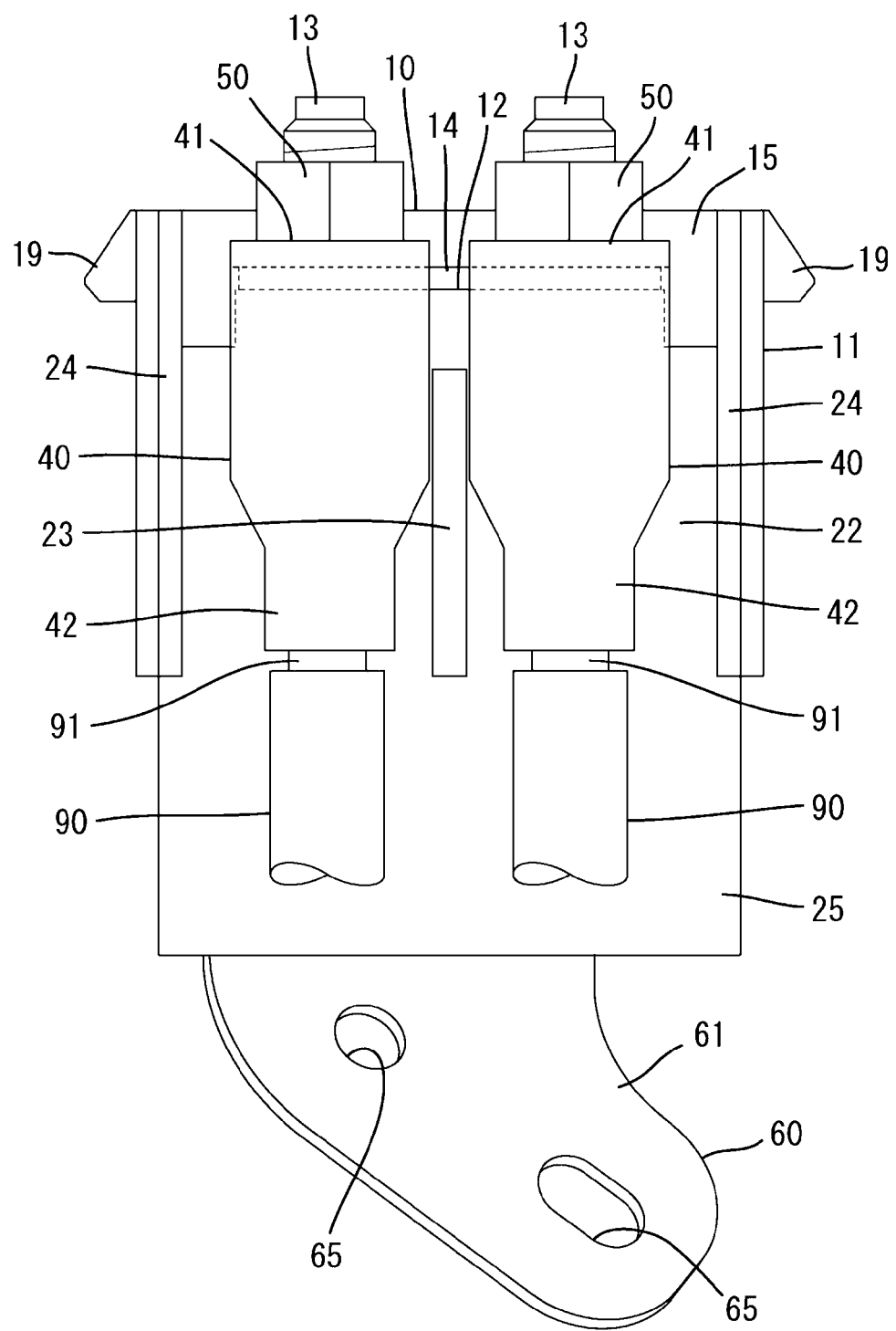
FIG. 3 is a rear view showing a state in which the terminal platform is fixed to the bracket, and the terminal fitting is fixed to the terminal fixing portion.
Figure 4:
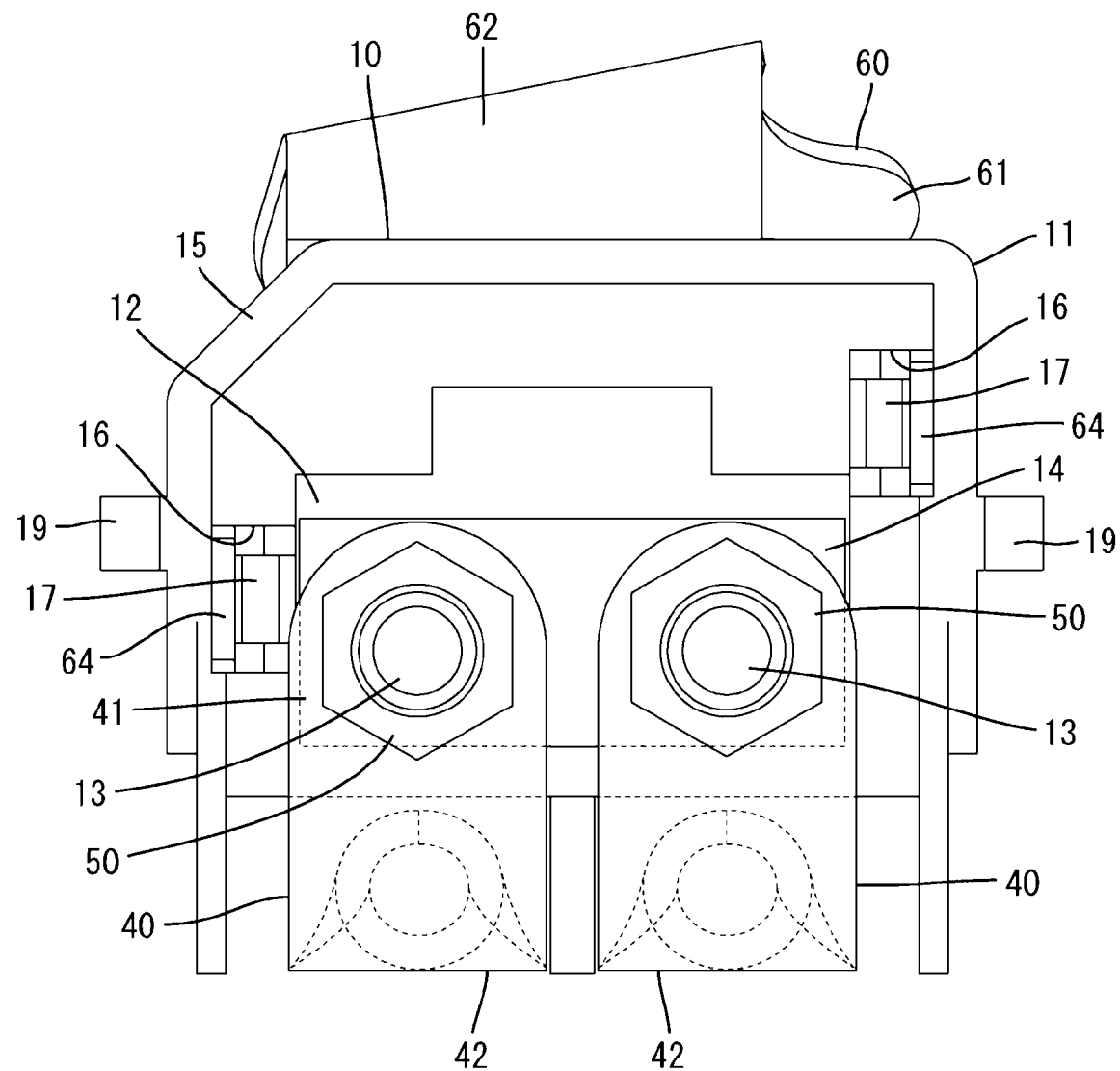
FIG. 4 is a plan view showing a state in which the terminal platform is fixed to the bracket, and the terminal fitting is fixed to the terminal fixing portion.

The terminal fittings 40 are of metal plate material and are bent into a substantially L shape. As shown in FIGS. 2-4, in a state in which the terminal fittings 40 are fixed to the terminal platform 10, they have a terminal main bodies 41 that are arranged substantially horizontally along the front-to-rear direction, and wire connection portions 42 that are bent downward from the terminal main bodies 41 and are arranged substantially vertically along a vertical direction. The wire connection portions 42 are connected by crimping to wire cores 91 that are exposed at end portions of wires 90. The terminal main bodies 41 each have a connection hole 43 through which passes a stud bolt 13, described below (see FIG. 2). As shown in FIG. 3, a pair of terminal fittings 40 is fixed to the terminal platform 10.

Figure 6:
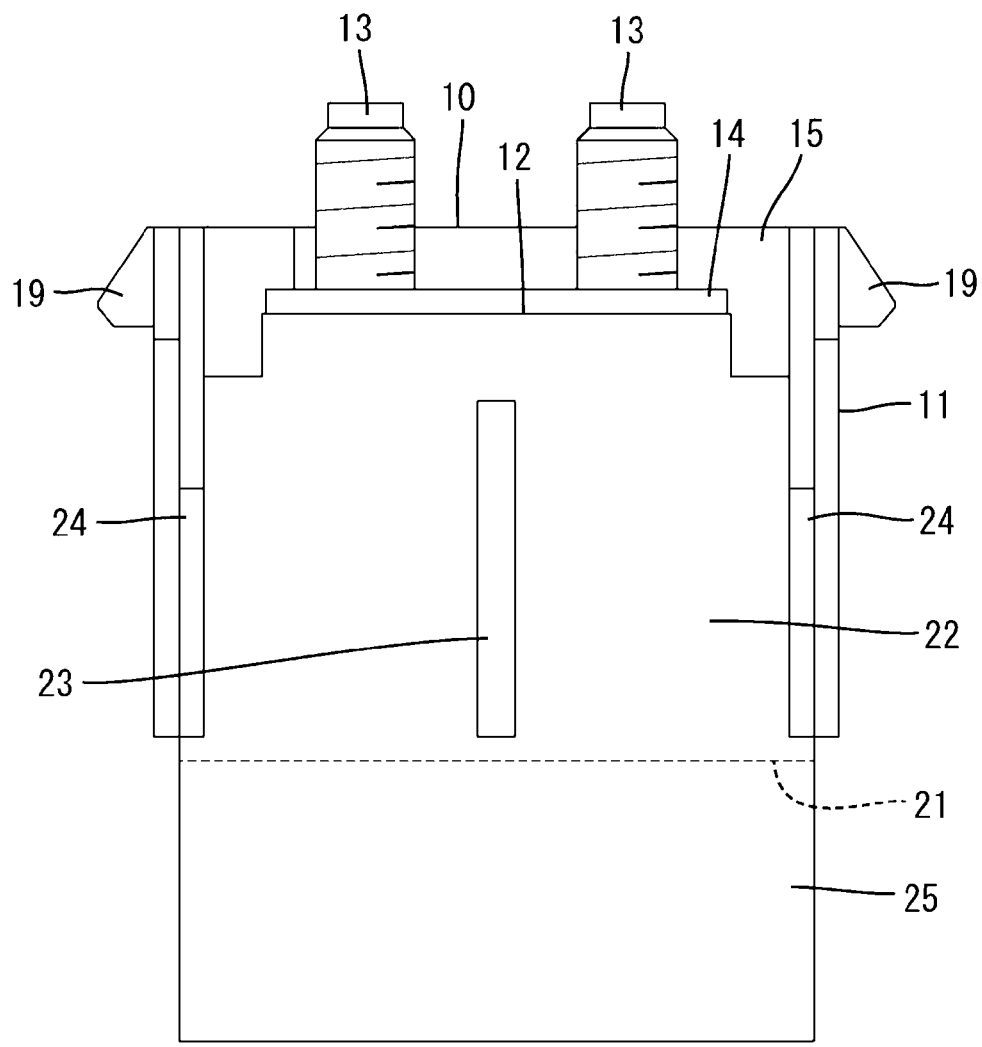
FIG. 6 is a rear view of the terminal platform.

The terminal platform 10 is of synthetic resin, and as shown in FIG. 1, is provided with a box-shaped platform main body 11 and a cap-shaped cover 30 that covers the platform main body 11. As shown in FIG. 4, at an upper surface of the platform main body 11, there is provided a terminal fixing portion 12 for fixing the terminal main body 41 of both terminal fittings 40. As shown in FIG. 6, stud bolts 13, which have a substantially cylindrical shape, and which form a pair in the width direction, are protrudingly arranged in the terminal fixing portion 12. Additionally, a strip-shaped connection terminal 14, inserted so as to span across both stud bolts 13, is exposedly arranged in the terminal fixing portion 12. At an upper surface of the platform main body 11, a peripheral wall 15 is protrudingly arranged, surrounding a periphery of the terminal fixing portion 12, excluding a rear end side at which the wire connection portions 42 are lead out (see FIG. 4).

Figure 5:
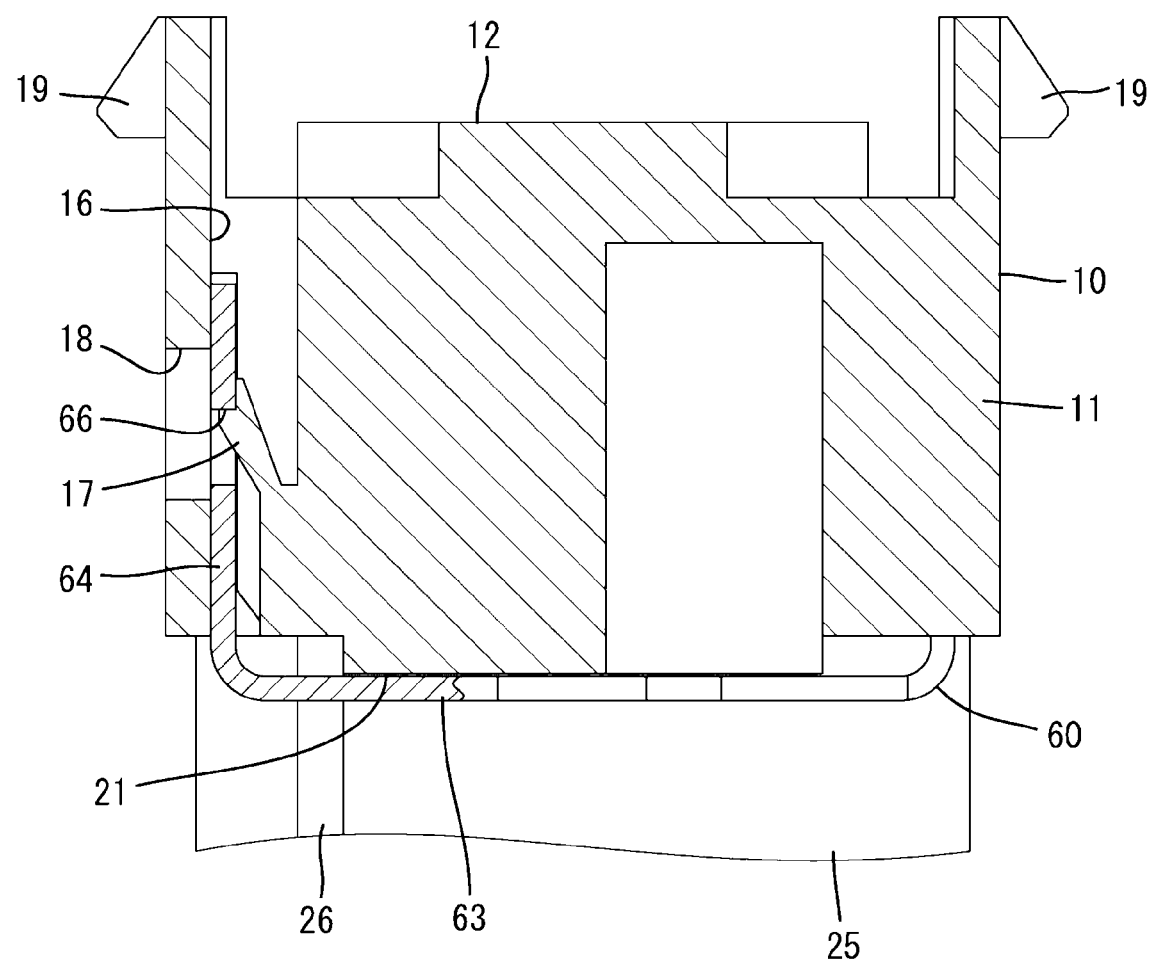
FIG. 5 is a cross-sectional view showing a structure by which the terminal platform is engaged to the bracket.

Additionally, as shown in FIG. 4, in the platform main body 11, there is provided a pair of mounting holes 16 that pass through in a vertical direction, at positions shifted relative to each other in the front-to-rear direction at two width-direction sides, between which is the terminal fixing portion 12. Furthermore, a pair of elastic locking arms 17 is provided on the platform main body 11 so as to face the inside of both mounting holes 16. As shown in FIG. 5, the elastic locking arms 17 extend diagonally upward in a cantilevered state from lower portions of the inside surfaces of the mounting holes 16, and can bendingly deform about the lower portions of the inside surfaces of the mounting holes 16 as a fulcrum. The attachment portions 64 of the bracket 60 are inserted into the mounting holes 16 from below, along inside surfaces of the mounting holes 16 (surfaces opposite to the surfaces at which the elastic locking arms 17 are connected). Leading end portions of the elastic locking arms 17 engage with the attachment holes 66 of the attachment portions 64, whereby the terminal platform 20 is locked to the bracket 60.

In outer surfaces at both sides of the platform main body 11, there is provided a pair of window holes 18 at positions facing the elastic locking arms 17 (see FIG. 5). As shown in FIGS. 1 and 5, the elastic locking arms 17 can be viewed from the sides through the window holes 18. Additionally, as shown in FIG. 6, a pair of lock portions 19 is protrudingly provided at upper end portions of outer surfaces of both sides of the platform main body 11. Later-described lock arms 31 of the cover 30 are engageable with both lock portions 19.

As shown in FIG. 5, at opening peripheries of the mounting holes 16 at a lower surface of the platform main body 11, there is provided a pair of support-receiving portions 21 that can abut against, and are supported by, the support portion 63 of the bracket 60. The support-receiving portions 21 are flat surfaces that are opposite, in a vertical direction, to the terminal fixing portion 12.

As shown in FIG. 6, a surface portion 22 is provided at a rear surface of the platform main body 11. The surface portion 22 is a flat surface that follows a direction perpendicular to surface directions of the terminal fixing portion 12 and the support-receiving portions 21, and is arranged so as to span from top to bottom from the terminal fixing portion 12 to the support-receiving portions 21.

As shown in FIG. 3, wire connection portions 42 of both terminal fittings 40 are arranged adjacent to each other, in the width direction, at the surface 22. At a width-direction center portion of the surface 22, there is provided a partition wall 23 that separates the two wire connection portions 42. The partition wall 23 is configured in a plate shape that extends in a vertical direction, and is arranged along a range that covers the entire crimp area of the wire connection portions 42.

At the end portions, in the width direction, of the surface 22, there is provided a pair of protection walls 24, at sides between which the wire connection portions 42 of the two terminal fittings 40 are interposed. Both protection walls 24 are configured in a plate shape that extends in a vertical direction. Lower ends of the protection walls 24 are arranged at the same height position as a lower end of the partition wall 23. The wire connection portions 42 of both terminal fittings 40 are covered and hidden from the side directions by the protection walls 24.

Additionally, the terminal platform 10 is provided with a partition wall 25 that extends downward from a lower end of the platform main body 11. The partition wall 25 has a flat plate configuration that connects coplanarly to the surface 22 and extends across an entire width of the platform main body 11. Additionally, the partition wall 25 is arranged along a range that covers the end portions of the wires 90. As shown in FIG. 2, the partition wall 25 is arranged facing the tip end of the support portion 63 of the bracket 60, in a front-to-rear direction. Additionally, as shown in FIG. 5, at a front surface of the partition wall 25, there is provided a plate-shaped protruding piece 26 that extends to the support-receiving portions 21. The protruding piece 26 is configured to extend substantially perpendicularly to the front surface of the partition wall 25.

The cover 30 is mounted to the platform main body 11 from above, so as to cover both terminal fittings 40 and the wires 90. The pair of lock arms 31, which extend out in a downward direction from outer surfaces of both sides of the cover 30, are elastically engaged by the two lock portions 19, whereby the cover 30 is lockedly held to the platform main body 11 (see FIG. 1). In a state in which the cover 30 is correctly mounted to the platform main body 11, the outer sides of the two protection walls 24 are covered by two side walls 32 of the cover 30. On an inner surface of the cover 30, undepicted partition plates are provided that separate the terminal main bodies 41 of the two terminal fittings 40.

Next, a method of assembling the terminal fittings 40 to the terminal platform 10 of embodiment 1, and operational effects, will be described.

First, the base plate portion 61 of the bracket 60 is fastened by bolts to an installation surface of an undepicted vehicle, and the bracket 60 is attached and fixed to the vehicle. Next, the terminal platform 10 is placed on the support portion 63 of the bracket 60. In so doing, the two attachment portions 64 of the bracket 60 are inserted into corresponding attachment holes 66 and elastically engaged with the elastic locking arms 17, the two attachment portions 64 of the bracket 60 are inserted into the mounting holes 16 of the platform main body 11, and the elastic locking arms 17 are inserted into, and elastically engaged with, the corresponding attachment holes 66 of the attachment portions 64, and the terminal platform 10 is mounted and fixed to the bracket 60. At this time, because the partition wall 25 is between (i) the wire connection portions 42 of the terminal fittings 40 and (ii) the support portion 63, there is no electrical contact between the wire connection portions 42 and the support portion 63.

Figure 8:
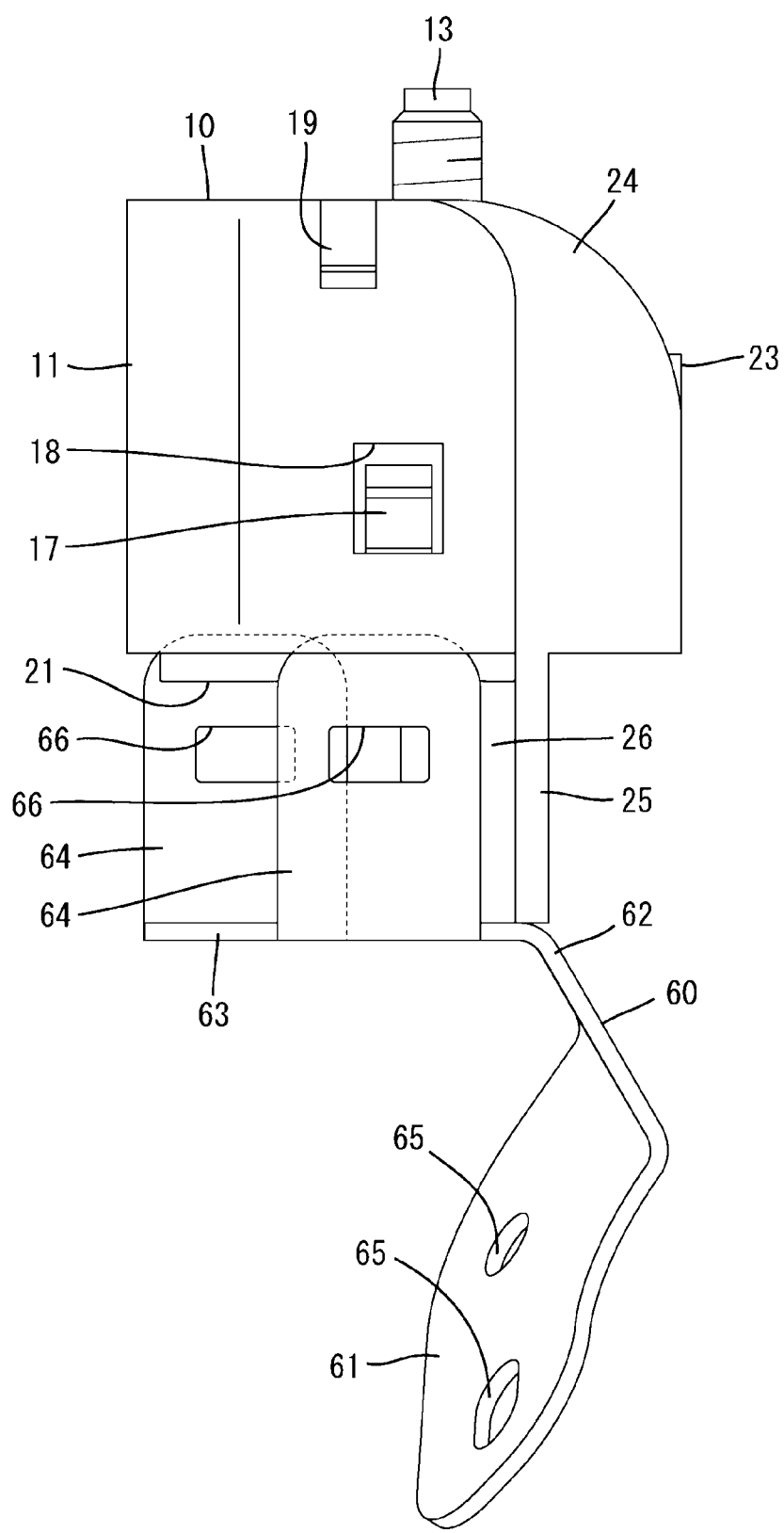
FIG. 8 is a side view showing a state in which erroneous assembly of the terminal platform to the bracket is restricted.

On the other hand, as shown in FIG. 8, if it is attempted to assemble the terminal platform 10 to the bracket 60 in an erroneous assembly orientation in which the front and rear of the terminal platform 10 are reversed, the lower end of the partition wall 25 abuts against the upper surface of the support portion 63 of the bracket 60, and assembly beyond that point is restricted. Therefore, the terminal platform 10 is not assembled to the bracket 60 in an erroneous assembly orientation.

After the terminal platform 10 has been assembled to the bracket 60, the terminal main bodies 41 of the two terminal fittings 40 are fixed to the terminal fixing portion 12 of the platform main body 11. At this time, the stud bolts 13 are passed through the connection holes 43 of the terminal main bodies 41, and as shown in FIG. 3, by fastening fixing members 50 such as nuts or the like to the stud bolts 13, the terminal main bodies 41 are fixed to the terminal fixing portion 12 of the platform main body 11. At the time of fastening the fixing members 50, the terminal fixing portion 12 is pressed, and a downward fixing force acts on the platform main body 11, but because the support-receiving portions 21 of the platform main body 11 are supported by the support portion 63 of the bracket 60 at positions opposing the direction in which the fixing force acts, the terminal platform 10 does not fall off from the bracket 60. Along with the fixing of the two terminal fittings 40 to the stud bolts 13 through the fixing members 50, the two terminal fittings 40 are connected to the connection terminal 14 that is inserted into the terminal fixing portion 12, and the two terminal fittings 40 are short-circuited to each other and connected through the connection terminal 14. Finally, the cover 30 is put on the platform main body 11, and the periphery of both terminal fittings 40 and the connection terminal 14 is covered and protected by the cover 30.

As described above, according to embodiment 1, because the terminal fixing portion 12 of the platform main body 11 is positioned at a side opposite to the support-receiving portions 21 that are supported by the support portion 63 of the bracket 60, the fixing force that acts on the terminal fixing portion 12 in connection with the fastening of the fixing members 50 is directly received by the support portion 63 through the support-receiving portions 21. Therefore, the terminal platform 10 is stably supported by the bracket 60.

Additionally, even though the tip ends of the support portion 63 are arranged at positions near the wire connection portions 42 of the terminal fittings 40, the partition wall 25 of the terminal platform 10 separates the tip ends of the support portion 63 from the wire connection portions 42, whereby electrical contact between the bracket 60 and the terminal fittings 40 is avoided. Therefore, electrical conduction reliability of the wire connection portions 42 is ensured.

Additionally, because the partition wall 23 provided on the surface 22 of the platform main body 11 separates the wire connection portions 42 of the two terminal fittings 40 that are adjacent in the width direction, electrical contact between the two terminal fittings 40 is also avoided.

Furthermore, if the terminal platform 10 is in an erroneous assembly orientation with respect to the bracket 60, the lower end of the partition wall 25 abuts against the support portion 63 of the bracket 60, and assembly beyond that point is restricted. Therefore, a condition of assembling the terminal platform 10 to the bracket 60 in an erroneous assembly orientation is avoided. Furthermore, because a structure that suppresses erroneous assembly is constituted by the partition wall 25, a special structure for suppressing erroneous assembly is not needed, and the overall structure can be simplified.

OTHER EMBODIMENTS

This invention is not limited to the embodiment described in the foregoing descriptions and the drawings. For example, modes such as the following are also included within the technical scope of this invention.

(1) A structure is also acceptable in which no connection terminal is provided in the terminal platform. For example, the terminal fitting may be constituted as battery terminal, and the terminal platform may comprise the battery housing.

(2) The support-receiving portions may be constituted by the entire lower surface of the platform main body.

(3) As long as the partition wall faces the tip ends of the support portions and separates the support portions from the wire connection portions, its shape is arbitrary. For example, the partition wall may be divided into two partition walls, one provided for each of the two terminal fittings.

(4) As long as the bracket has a support portion that supports a support-receiving portion of the terminal platform, its shape is arbitrary. For example, the transition portion of the bracket may be omitted, and the bracket may have a configuration that is bent into a substantially L shape with the support portion and the base plate portion.

DESCRIPTION OF SYMBOLS

10 Terminal platform
11 Platform main body
12 Terminal fixing portion
21 Support-receiving portions
22 Surface
23 Partition wall
25 Partition wall
40 Terminal fittings
41 Terminal main bodies
42 Wire connection portions
60 Bracket
63 Support portion
90 Wires

What is claimed is:

1. A resin terminal platform that supports a terminal fitting having (i) a wire connection portion to be connected to a wire and (ii) a terminal main body that extends in a direction intersecting the wire connection portion, and that comprises:
   a platform main body including:
   (i) a support-receiving portion that is supported by a support portion formed on a metal bracket, (ii) a terminal fixing portion that is positioned at a side opposite to the support-receiving portion and fixes the terminal main body of the terminal fitting, and (iii) a surface portion that is arranged at a side intersecting the terminal fixing portion and the support-receiving portion, and that is along the wire connection portion of the terminal fitting, and a first partition wall that extends to the surface portion of the platform main body and is arranged facing a tip end of the support portion.

2. The terminal platform of claim 1, wherein the terminal fixing portion includes a plurality of terminal fixing portions and the terminal platform supports the plurality of terminal fixing portions, and a second partition wall that separates the wire connection portions, which are adjacent in a width direction, is provided on the surface portion of the platform main body.

3. The terminal platform of claim 1, wherein the first partition wall is configured to extend out from the platform main body, and a tip end of the first partition wall abuts against the support portion of the bracket to discourage incorrect assembly under the condition that the terminal platform and the bracket are assembled in a reversed orientation that is opposite to a normal orientation.

4. The terminal platform of claim 2, wherein the first partition wall is configured to extend out from the platform main body, and a tip end of the first partition wall abuts against the support portion of the bracket to discourage incorrect assembly under the condition that the terminal platform and the bracket are assembled in a reversed orientation that is opposite to a normal orientation.

5. A resin terminal platform that supports a terminal fitting having (i) a wire connection portion to be connected to a wire and (ii) a terminal main body that extends in a direction intersecting the wire connection portion, the terminal platform comprising:

a platform main body;

a metal bracket on the platform main body;

a support portion formed on the metal bracket;

a support-receiving portion that is supported by the support portion;

a terminal fixing portion that is positioned on the platform main body at a side opposite to the support-receiving portion and fixes the terminal main body of the terminal fitting into place;

a surface portion that is arranged on the platform main body at a side intersecting the terminal fixing portion and the support-receiving portion, and that is along the wire connection portion of the terminal fitting; and a first partition wall that extends between (i) the wire connection portion of the terminal fitting and (ii) the support portion.

6. The terminal platform of claim 5, wherein the terminal fixing portion includes a plurality of terminal fixing portions and the terminal platform supports the plurality of terminal fixing portions, and a second partition wall that separates the wire connection portions, which are adjacent in a width direction, is provided on the surface portion of the platform main body.

7. The terminal platform of claim 5, wherein the first partition wall is configured to extend out from the platform main body, and a tip end of the first partition wall abuts against the support portion of the bracket to discourage incorrect assembly under the condition that the terminal platform and the bracket are assembled in a reversed orientation that is opposite to a normal orientation.

8. The terminal platform of claim 6, wherein the first partition wall is configured to extend out from the platform main body, and a tip end of the first partition wall abuts against the support portion of the bracket to discourage incorrect assembly under the condition that the terminal platform and the bracket are assembled in a reversed orientation that is opposite to a normal orientation.

* * * * *